UNITED STATES PATENT OFFICE.

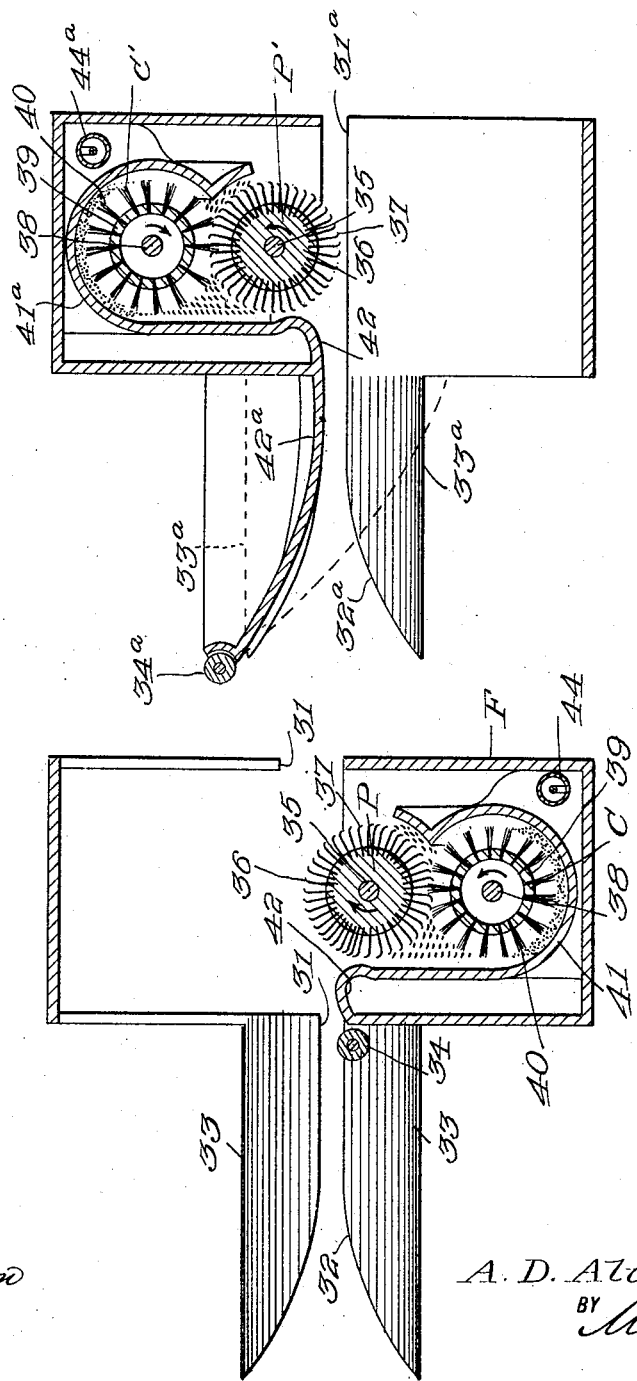

ALLEYNE D. ALVIN, OF SAN ANTONIO, TEXAS, ASSIGNOR OF ONE-HALF TO FREDERICK M. MUELLER, OF SAN ANTONIO, TEXAS.

COTTON-PICKING APPARATUS.

1,396,012.  Specification of Letters Patent.  Patented Nov. 8, 1921.

Application filed July 9, 1920. Serial No. 395,091.

*To all whom it may concern:*

Be it known that I, ALLEYNE D. ALVIN, a citizen of the United States, and a resident of San Antonio, in the county of Bexar and State of Texas, have invented certain new and useful Improvements in Cotton-Picking Apparatus, of which the following is a specification.

My invention relates to apparatus for picking cotton from the plants in the field, and a purpose of my invention is the provision of an apparatus of this character in which a pair of picking members are so constructed, supported and operated as to effect a complete removal of the cotton from the plants without collecting matter foreign to the cotton and without injury to the plants.

It is also a purpose of my invention to provide a cotton picking apparatus including a wheel supported chassis which is vertically adjustable to render the apparatus applicable to and operable over fields of various inclination, the picking members being movably supported from the chassis whereby they automatically adjust themselves to plants occupying various angular positions within a row.

I will describe one form of cotton picking apparatus embodying my invention and will then point out the novel features thereof in claims.

In the accompanying drawings:

Fig. 4 is a horizontal longitudinal sectional view taken on the line 4—4 of Fig. 1.

Similar reference characters refer to similar parts in each of the several views.

Figure 1:
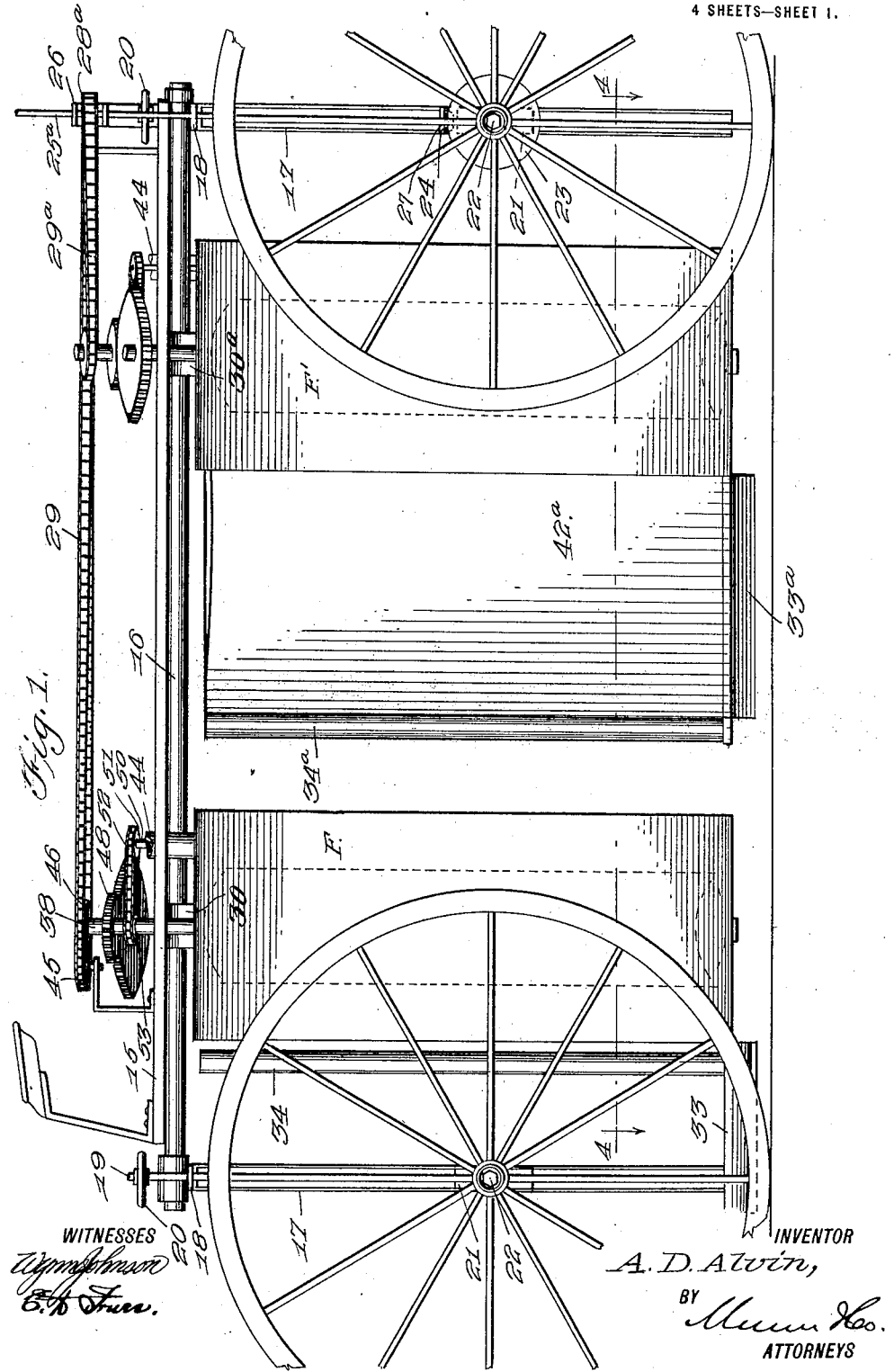
Figure 1 is a view showing in side elevation one form of cotton picking apparatus embodying my invention.

Referring specifically to the drawings, my invention in its present embodiment comprises a chassis constituted of a rectangular plate or floor 15 to the under side of which is secured a tubular rod 16 at a point along the longitudinal axis of the plate. The chassis is supported for movement over the ground by means of wheels W and W', the wheels W constituting the steering wheels of the apparatus and the wheels W' constituting the driving means for the picker member, as will be more clearly described hereinafter. The chassis is supported for vertical adjustment upon the wheels W and W' by means of channel bars 17 which are secured at their upper ends to cross bars 18 secured to the opposite ends of the rod 16 in the manner clearly shown in Figs. 2 and 3. Threadedly fitted within the cross bars 18 and extending into the channel bars 17 are screw-threaded shafts 19 provided at their upper ends with actuating wheels 20 for rotating the same in one direction or another. Embracing the shafts 19 and slidably fitted within the channel bars 17 are blocks 21 formed with threaded bores to receive the shafts, as will be understood. The blocks 21 have fixed thereto stub axles 22 upon which the wheels W and W' are journaled.

By this arrangement it will be seen that when the shafts 19 are rotated in one direction or the other through the medium of the wheels 20, an upward or downward feeding of the same through the blocks 21 is effected so as to cause an elevation or lowering of the chassis with respect to the wheels. As the cross bars 18 are loosely fitted on the rod 16, it will be apparent that an adjustment of one side or of one end of the chassis can be effected independently of the other. This permits of the supporting of the chassis in such manner that the apparatus can be operated over cotton plants irrespective of the inclination of the land.

My invention includes picking members and cleaning members which are adapted to be actuated by a mechanism driven by the wheels W'. To this end I provide the wheels W' with adjustable gears 23 that mesh with beveled pinions 24 fixed to the lower ends of a pair of shafts 25 and 25ª. The shafts 25 are journaled at their lower ends in arms 27 fixed to the corresponding blocks 21. The shafts 25 and 25ª are also slidably fitted within the hangers 26 next to the plate 15. Keyed on the shafts 25 and $25^a$ at a point between the hangers 26 are sprockets 28 and $28^a$ about which are trained chains 29 and $29^a$. The sprockets 28 and $28^a$ are keyed to the shafts 25 and $25^a$ in such manner as to permit free longitudinal movement of the shafts but at the same time to lock the sprockets to the shafts for rotation therewith irrespective of the position of the shafts. This arrangement permits of the driving of the sprockets 28 and $28^a$ by the wheels W' irrespective of the position of the chassis with respect to the wheels.

Figure 2:
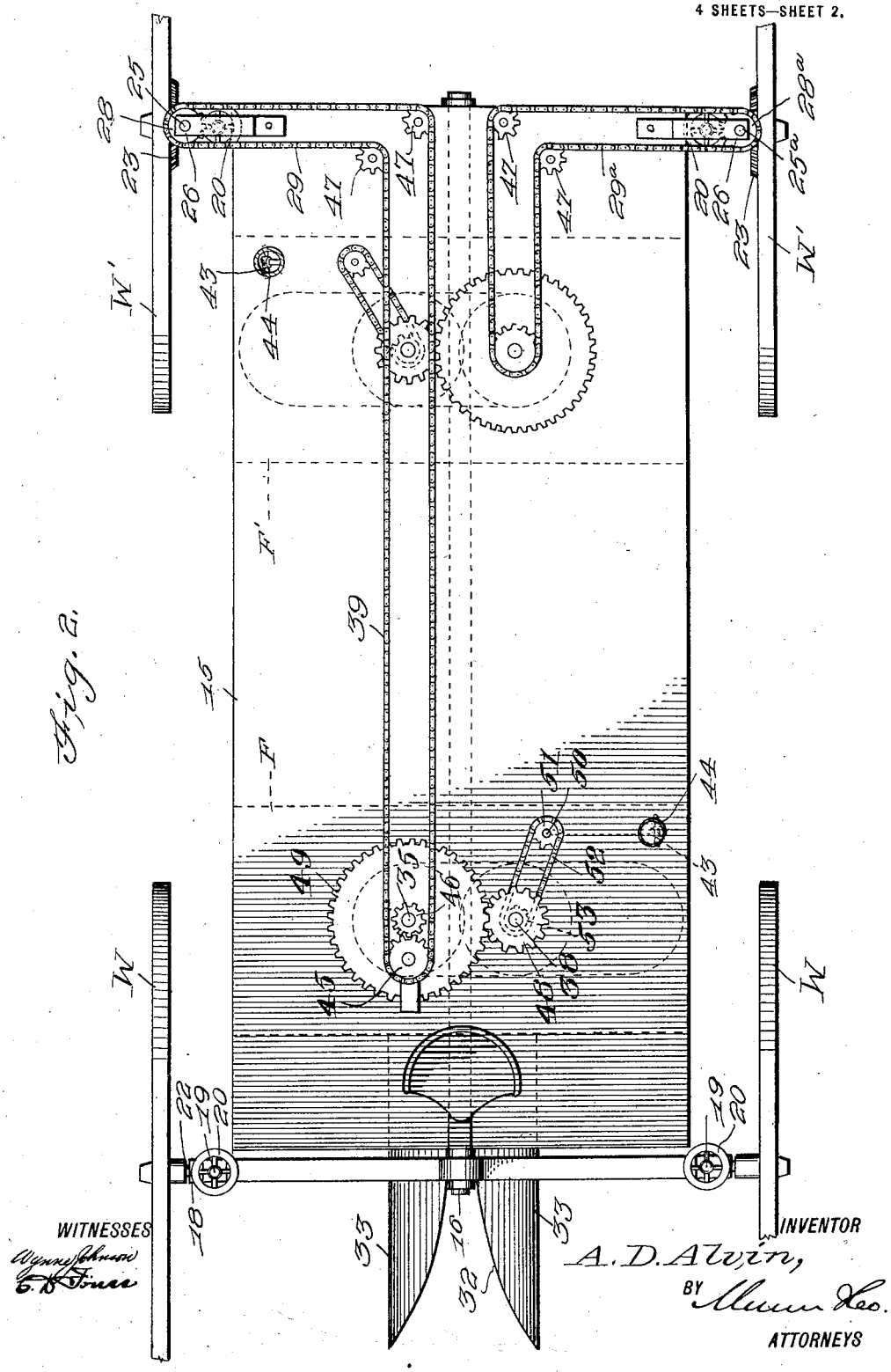
Fig. 2 is a top plan view of the apparatus shown in Fig. 1.
Figure 3:
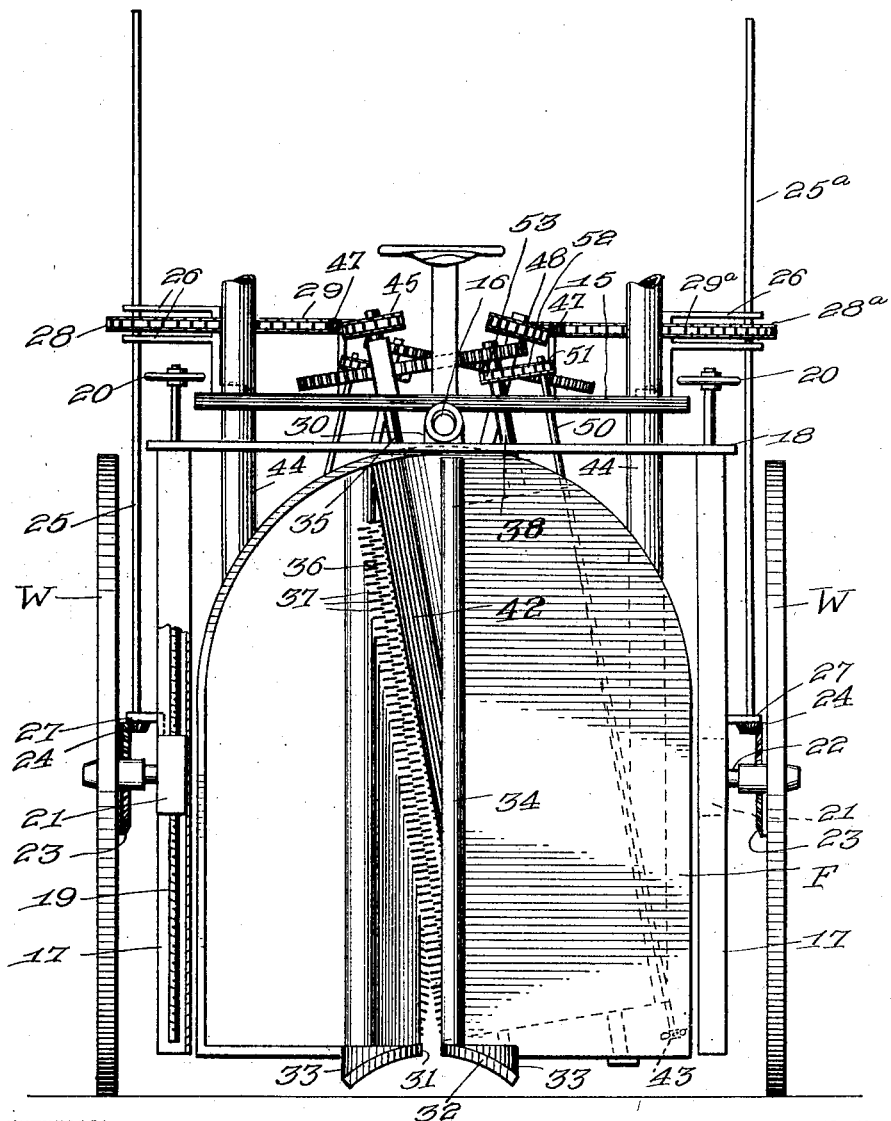
Fig. 3 is a front end elevation of the apparatus shown in the preceding views with parts thereof broken away.

As shown in Fig. 4, the picking members are designated at P and P' and the cleaning members at C and C'. The picking member P and the cleaning member C are journaled and supported in inclined positions with respect to the vertical in a frame designated generally at F. The frame F is supported for swinging movement transversely of the chassis by a bracket 30, as clearly shown in Fig. 1. As shown in Figs. 2 and 3, the frame F is of rectangular formation in cross section with its upper end rounded. One-half of the rear and front side of the frame, as well as the opposite ends thereof, are closed so as to provide a housing partially inclosing the picking member P and the cleaning member C. The lower end of the frame F is provided centrally thereof with a slot designated at 31 which communicates with an adjustable slot 32 formed between a pair of guide fingers 33 secured to or formed integral with the forward side of the frame at a point adjacent its base. The guide fingers 33 are preferably gripped in the manner shown in Fig. 3, one of the fingers carrying a roller 34 which is coextensive in height with the frame, as clearly shown in Fig. 3. The purpose of this roller 34 is to prevent bruising or in any way injuring the cotton plants during their movement through the slot 32 as will be more clearly described hereinafter.

As illustrated to advantage in Figs. 2 and 3, the picking member P is supported so as to overlie the slot 31, the cleaning member C being disposed in parallel relation to the picking member but at one side of the slot 31. The picking member P comprises, in the present instance, a shaft 35 to which is fixed a roller 36. Extending radially from the roller 36 are hooks 37. The hooks 37 have their bills extending circumferentially of the roller and in the same direction, for a purpose which will be hereinafter described. As shown in Fig. 3, the cleaning member C comprises a shaft 38 to which is fixed a roller 39 carrying radially disposed brushes 40 which are of such a length as to engage the hooks 37. Partially surrounding the cleaning member C is a casing 41 for confining and directing the picked cotton downwardly to the lower end thereof for subsequent collection. Formed integral with the casing 41 and connecting the latter to the side of the frame F is a guard plate 42, such plate extending rearwardly on the inner end of the slot 32 and curved longitudinally and transversely so as to lie in a plane substantially parallel to the axis of the picking members P. The purpose of this particular arrangement of the guard plate 42 is to effect the feeding of the cotton plants through the picking member in the plane parallel to the plane of the latter, and to thereby hold the cotton plant under tension and in engagement with the hooks 37.

Cotton deposited within the casing 41 is withdrawn therefrom and conveyed to a suitable storage receptacle (not shown) by means of a fan 43, such as shown in Fig. 3, disposed adjacent the lower end of the casing and adjacent the lower end of a pipe 44. The pipe 44 extends upwardly from the frame F where it may be connected to the receptacle just mentioned. The fan 43 is rotated in such direction as to create a draft downwardly of the casing 41 and upwardly of the pipe 44 thus causing the cotton deposited within the casing to be ejected therefrom through the pipe 44.

The picking member P' is of the same construction as the picking member P with the exception that the bills of the hooks 37 extend in an opposite direction about the roller. The picking member P' is journaled in a frame F' similar in construction to the frame F and provided with a slot $31^a$ which communicates at its forward end with a tapered slot $32^a$ formed between a pair of guide fingers $33^a$ similar in construction to the guide fingers 33. The frame F' is likewise mounted for swinging movement transversely of the chassis by a bracket $30^a$ which loosely embraces the rod 16. As previously stated, a picking member P' occupies an inclined position with relation to the vertical, such inclination, however, being the reverse of the inclination of the picking member P so that the two, when viewed from the front end of the apparatus, as shown in Fig. 3, intercept each other at points above the guide fingers 33 and $33^a$. In this position of the picking member P', the hooks 37 thereof overlie the slot $31^a$ so as to engage the cotton plants as the latter traverse said slot. The cleaning member C' is of the same construction as the cleaning member C and occupies a parallel position with respect to the picking member P'. The picking member P' and the cleaning member C' are likewise partially incased by the casing $41^a$ which is formed integral with the forward side of the frame F and with a guide plate $42^a$. The guide plate $42^a$ is designed for the same purpose as the guide plate 42, and is curved in the opposite direction to feed the cotton plants into engagement with the hooks of the picking member P'. The cotton in the casing 41ª is withdrawn from and conveyed to a suitable receptacle (not shown) by a pipe 44ª in which a draft is created by means of a fan (not shown) operated in the same manner as the fan 43.

In the present instance I have shown the driving mechanism for the picking member P and the cleaning member C as actuated by one of the driving wheels W', while the mechanism for the picking member P' and the cleaning member C' is actuated by the other driving wheel W'. This arrangement allows of the independent driving of either pair of members.

The driving mechanism for one pair of members is substantially identical to the driving means for the other pair of members so that a description of one will suffice for both. The driving mechanism for the picking member P and the cleaning member C includes the bevel gear 23, bevel pinion 27, shaft 25, sprocket 28, and chain 29. As shown in Fig. 2, the chain 29 is also trained about a sprocket wheel 45 which meshes with a sprocket wheel 46 fixed to the upper end of a shaft 35. The two stretches of the chain 29 are trained about similar sprocket wheels 47 so as to properly tension and position the chain upon the chassis, as will be understood. Through this mechanism, a driving of the picking member P is effected in the direction of the arrow in Fig. 4 so that the hooks 37 when engaging a cotton plant passing through the slot 31 move in the direction of the plant. The cleaning member C is driven through a cog wheel 48 which meshes with a relatively large cog wheel 49 fixed to the shaft 35. The cog wheel 48 is fixed to the shaft 38 and thus effects rotation of the cleaning member in the reverse direction of the picking member as indicated by the arrow in Fig. 4.

For driving the fan 43, a shaft 50 is provided to the lower end of which is fixed a sprocket wheel 51 which is embraced by an endless chain 52 that is also trained about the sprocket wheel 53 fixed to the shaft 38.

As indicated by the arrows in Fig. 4, the picking member P' is rotated in a counterclockwise direction or in a direction reverse to the direction of rotation of the picking member P. Such direction of rotation is for the purpose of causing the hooks of the picking member P' to move in the direction of movement of the cotton plant passing through the slot 31ª. The cleaning member C' is moved in a counterclockwise direction or the reverse of the picking member P'.

The operation of the entire apparatus is as follows:

When the apparatus is drawn over a row of cotton plants, the forward pair of guide fingers are caused to successively engage each cotton plant at a point adjacent the base of the stalk and to thus laterally shift the entire frame F so as to position such frame centrally of the cotton plant. Upon continued movement of the apparatus, each cotton plant traverses the slot 32 passing over the roller 34, such roller preventing bruising or injuring the branches of the plant in any way, as has been described. From the roller 34, the plant engages the guide plate 42, and because of the curvature of the latter a bending of the plant to the left, as when viewed in Fig. 4, is effected. As the cotton plant normally tends to assume a substantially vertical position, it will be apparent that when bent to the side, it will be under tension, and as the guide plate 42 extends into close proximity with the hooks 37 of the picking member P, the plant will be in bent position when engaged by the picking member so as to force the plant into engagement with the hooks. With the picking member P rotating in the direction of the arrow, it will be clear that the hooks 37 are caused to successively engage and thereby remove the cotton from the plant, and as the picking extends substantially the entire height of the plant, a complete removal of the cotton from one side of the plant is effected. The cotton is subsequently removed from the hooks 37 by the cleaning member C, it being noted that, from a consideration of the driving mechanism previously described, the cleaning member rotates substantially at three times the speed of the picking member thus causing the several brushes 40 to wipe the bills of the hooks 37 in the direction of their free ends and thereby effecting a removal of the cotton from the hooks. The cotton removed from the picking member P is deposited to the lower end of the casing 41 and removed in the pipe 44 as has been described.

Upon continued movement of the apparatus over the row of cotton plants, each plant upon passing the picking member P leaves the frame through the slots 31 and again assumes a normal position. However, upon engagement with the guide plate 42ª, such plant is bent to the right as viewed in Fig. 4 and simultaneously engaged by the guide fingers 32ª so as to properly position the frame F' with respect to the plant. The roller 34ª prevents injury to the branches of the plant as it engages the guide plate 42ª. In a manner similar to that described in connection with the picking member P, each plant traverses the guide plate 42ª passing into the slot 31ª and upon leaving the guide plate engages the picking member P'. The picking member P' also rotating in the direction in which the plant moves effects a removal of the cotton from the opposite side of the plant, and such plant being held under tension causes the hooks to engage and remove the cotton as will be understood. The cleaning member C' functions to remove the cotton from the hooks in the same manner as the cleaning member C.

From the foregoing operation, it will be manifest that my apparatus provides means for successively bending a plurality of cotton plants first to one side and then the other, and effecting a removal of the cotton therefrom first from one side and then the other while the plants are held under tension. As this operation is automatic throughout, it will be clear that all that is necessary is for the operator to properly position the apparatus with respect to a row of cotton plants and to then move the apparatus over the row. If the inclination of the land over which the apparatus is traveling is such as to prevent the frames F occupying the proper position so that the picking members may properly function, an adjustment of the apparatus can be readily effected by manipulation of the wheels 20 to properly position the chassis with respect to the wheels.

Although I have herein shown and described only one form of cotton picking apparatus embodying my invention, it is to be understood that various changes and modifications may be made herein without departing from the spirit of the invention and the spirit and scope of the appended claims.

What I claim is:

1. A cotton picking apparatus comprising, wheels, a chassis supported by said wheels and vertically adjustable thereon, frames supported for swinging movement on the chassis, said frames being arranged one in advance of the other and having alined slots formed therein, picking rollers journaled in said frames and extending into said slots, cleaning rollers journaled in said frames and associated with said picking rollers for effecting a removal of the cotton therefrom, guard plates partially surrounding all of said rollers, guide fingers arranged in advance of said frames for guiding the plants into said slots, guide plates above said guide fingers and in advance of said picking rollers, pneumatic conveying means associated with said cleaning rollers, and means operable by said wheels for actuating all of said rollers and said conveying means.

2. A cotton picking apparatus comprising, wheels, a chassis vertically adjustable on said wheels, frames supported for swinging movement transversely of the chassis, said frames being arranged one in advance of the other and formed with alined slots extending longitudinally of the chassis, rotatable picking members journaled in the frames, rotatable cleaning members associated with the picking members, means engageable with the base of cotton plants for guiding the latter into said slots, means for guiding and bending the plants so that they successively occupy positions parallel with respect to the picking members, and means operable by said wheels for actuating said picking and cleaning members.

3. A cotton picking apparatus comprising, a wheel supported chassis, a pair of rotatable picking members supported for swinging movement transversely of the chassis, said members occupying oppositely inclined positions and arranged one in advance of the other, each of said members comprising a roller and picking hooks extending radially from said roller with their bills extending in the direction of rotation of the roller, rotatable cleaning members engageable with said hooks, means for guiding cotton plants into successive engagement with said picking member, and means for actuating the picking members and the cleaning members to cause the hooks of the former to move in the same direction as the cotton plants when engaging such plants, and for causing the cleaning members to move in the same direction as said hooks at the point of engagement with said hooks.

4. A cotton picking apparatus comprising, a wheel supported chassis, a frame mounted for swinging movement transversely of the chassis, a rotatable picking member journaled in the frame and occupying an inclined position with respect to the vertical, a rotatable cleaning member adapted to engage the picking member, guide fingers secured to the base of said frame and adapted to engage the cotton plants at their base for guiding the same into said slot, a guide plate arranged above the guide fingers and curved to cause the cotton plants to occupy a parallel position with respect to the picking members, and means for rotating said picking and cleaning members in opposite directions and at different speeds.

5. A cotton picking apparatus comprising, a chassis, picking members supported for swinging movement transversely of the chassis, said picking members being arranged to engage first one side and then the other of a cotton plant, wheels for supporting the chassis, mechanism operable by said wheels for operating said picking members, means for vertically adjusting said chassis on said wheels, and comprising, channel bars fixed to the chassis, screw-threaded shafts within said bars, screw-threaded blocks engaging said shafts, axles carried by said blocks and supporting said wheels.

6. A cotton picking apparatus comprising, a chassis, picking members supported for swinging movement transversely of the chassis and arranged to engage first one side and then the other of a cotton plant, wheels for supporting the chassis, and mechanism operable by the wheels for actuating the picking members comprising, gears fixed to said wheels, shafts vertically movable on the chassis, and beveled gears fixed to said shaft and engageable with the first beveled gears.

7. A cotton picking apparatus comprising, a chassis, rotatable picking members supported for independent swinging movement transversely of the chassis and arranged one behind the other, means for guiding cotton plants into engagement with said members comprising divergently arranged guide fingers, wheels for supporting the chassis, and means for vertically adjusting the chassis with respect to said wheels to vary the vertical position of the picking members and said guiding means.

ALLEYNE D. ALVIN.